United States Patent
Guntermann et al.

(10) Patent No.: US 8,525,047 B2
(45) Date of Patent: Sep. 3, 2013

(54) ELECTRICAL FEED-THROUGH FOR HERMETIC COMPRESSORS

(75) Inventors: Bernd Guntermann, Lennestadt (DE); Thomas Alberternst, Aachen (DE); Jochen Petzke, Hennef (DE); Eric Rooks, Köln (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 312 days.

(21) Appl. No.: 13/014,253

(22) Filed: Jan. 26, 2011

(65) Prior Publication Data

US 2011/0186350 A1 Aug. 4, 2011

(30) Foreign Application Priority Data

Jan. 29, 2010 (DE) .......................... 10 2010 001 381
Nov. 11, 2010 (DE) .......................... 10 2010 043 773

(51) Int. Cl.
*H02G 3/18* (2006.01)

(52) U.S. Cl.
USPC ............ 174/652; 174/650; 174/659; 361/302

(58) Field of Classification Search
USPC ................. 174/50.5, 50.52, 50.59, 152 GM, 174/50.63, 652, 659, 650, 152 G, 153 G; 439/935, 926, 685, 282, 587; 361/302, 320, 361/306.2, 328, 321, 309, 306.11
See application file for complete search history.

(56) References Cited

U.S. PATENT DOCUMENTS

| | | | |
|---|---|---|---|
| 2,235,429 A | | 3/1941 | Henry et al. |
| 3,801,727 A | | 4/1974 | Wilkinson et al. |
| 4,461,925 A | * | 7/1984 | Bowsky et al. ........ 174/152 GM |
| 4,984,973 A | * | 1/1991 | Itameri-Kinter et al. ...................... 174/152 GM |
| 5,563,562 A | * | 10/1996 | Szwec ................... 174/152 GM |
| 6,107,566 A | * | 8/2000 | Quadir et al. ............... 174/50.52 |
| 6,273,754 B1 | * | 8/2001 | Bunch et al. ................... 439/587 |
| 6,362,424 B1 | | 3/2002 | Honkomp et al. |
| 6,509,525 B2 | * | 1/2003 | Honkomp et al. .... 174/152 GM |
| 7,094,968 B2 | * | 8/2006 | Motzigkeit ................... 174/659 |

FOREIGN PATENT DOCUMENTS

| | | |
|---|---|---|
| DE | 1046171 B | 12/1958 |
| DE | 1189666 B | 3/1965 |
| DE | 1916318 A1 | 10/1970 |
| DE | 3324466 A1 | 1/1985 |
| DE | 3324466 C2 | 1/1985 |

* cited by examiner

*Primary Examiner* — Angel R Estrada
(74) *Attorney, Agent, or Firm* — Fraser Clemens Martin & Miller LLC; J. Douglas Miller

(57) ABSTRACT

An electrical feed-through includes an electrically conductive connection pin and an elastic insulation member coupled to the connection pin by vulcanizing the insulation member, wherein the coupled connection pin and insulation member are arranged in an opening of a casing and pressure-tightly clamped in the opening by a fastening element.

18 Claims, 2 Drawing Sheets

ELECTRICAL FEED-THROUGH FOR HERMETIC COMPRESSORS

CROSS-REFERENCE TO RELATED APPLICATION

The present application claims priority to German Patent Application Serial Number DE 102010001381.1 filed Jan. 29, 2010 and German Patent Application Serial No. 102010043773.5 filed Nov. 11, 2010, the entire disclosures of which are hereby incorporated herein by reference.

FIELD OF THE INVENTION

The invention relates to a pressure-tight, electrically insulating feed-through for an electric connection, the feed-through particularly usable for hermetic compressors in refrigerant circuits.

BACKGROUND OF THE INVENTION

In hermetic compressors, the problem exists of an electric connection and an accompanied electrical feed-through leading through a casing of the hermetic compressor combined with the problem of pressure tightness of the feed-through, as there is a pressure difference between an interior of the casing and an outside environment.

Therefore, appropriately pressure-tight feed-throughs, which at the same time electrically insulate against the compressor casing, are needed.

Various types of insulating and pressure-tight casing feed-throughs are known, particularly for the connection of HVAC compressors.

Typically, electrical casing feed-throughs are established as insulation members made of glass or ceramic combined with sealing elements such as O-rings or flat gaskets. An electrically conductive connecting or conductor pin(s) is passed through the insulation member made of glass or ceramic. Sealing between the conductor pin and the insulation member is problematic.

In certain embodiments, a metal sleeve typically encloses the insulation member and is arranged in an opening of the casing. An additional elastic seal ensures sealing of the conductor feed-through against the casing.

In U.S. Pat. No. 6,362,424 B1, a conductor feed-through is disclosed, referred to as hermetic connection assembly. The disadvantages of the prior art feed-through are the problematic sealing of the glass/metal-connection, due to the different expansion coefficients, for example, and the fragility of glass or ceramic when mechanically loaded.

To overcome the disadvantages of U.S. Pat. No. 6,362,424 B1, German Pat. No. DE 33 24 466 C2 proposes to create sealing by use of an insulation member made of a flexible material such as elastomers or thermoplastics. The solution proposed in German Pat. No. DE 33 24 466 C2 is disadvantageous in that no permanent sealing between the conductor pin and the flexible insulation member is ensured. In addition, assembling must be executed very cautiously and carefully to prevent the conductor pins and the opening that accepts the conductor pins from being damaged.

Accordingly, it is desirable to develop an electrical conductor feed-through capable of being connected to a casing in an electrically insulated and pressure-tight manner as well as withstanding mechanical loads and temperatures of about 150° C. A solution is also to be designed to consist of as few as possible components and to be capable of being easily mounted and produced at low cost.

SUMMARY OF THE INVENTION

Concordant and consistent with the present invention, the shortcomings of the prior art are overcome by an electrical conductor feed-through of the present invention, wherein the electrical conductor feed-through is capable of being connected to a casing in an electrically insulated and pressure-tight manner as well as withstanding mechanical loads and temperatures of about 150° C.

In one embodiment, an electrical feed-through comprises: an electrically conductive connection pin; and an elastic insulation member coupled to the connection pin, wherein the coupled connection pin and insulation member are arranged in an opening of a casing and pressure-tightly clamped in the opening by a fastening element.

In another embodiment, an electrical feed-through comprises: a plurality of electrically conductive connection pins; and an elastic insulation member coupled to at least a portion of each of the connection pins, wherein the coupled connection pin and insulation member are arranged in an opening of a casing and pressure-tightly clamped in the opening by a fastening element.

In yet another embodiment, an electrical feed-through comprises: an electrically conductive connection pin; and an elastic insulation member coupled to the connection pin, wherein the coupled connection pin and insulation member are arranged in an opening of a casing and pressure-tightly clamped in the opening by a fastening element, the elastic insulation member including a hose-shaped extension extending axially from the insulation member with respect to the connection pin and a protrusion circumferentially formed around at least a portion of the insulation member.

The chemical-physical, or material, connection of the insulation member and the connection pin, which is also termed as pin or conductor pin, can be easily manufactured and is permanently pressure-tight and electrically insulating. The according feed-through is cost effective and withstands mechanical loads very well. Thermal stability and chemical resistance can be ensured by use of suitable materials. The conductor pin and the insulation member form the structural unit of the feed-through.

The present invention includes a connection over several layers that is of chemical nature and is understood as a material connection between elastomer, or plastic, respectively, and metal. The present invention also includes a connection between plastic and metal with crosslinked materials.

In an advantageous embodiment of the invention, a sleeve is connected to the insulation member in order to induce the tension into and axially support the insulation member.

Furthermore, the insulation member is provided with a hose-shaped extension that increases the total insulation resistance.

According to an embodiment, the insulation member is totally or partly insertable into the opening of the casing and fastenable to the casing by means of a fastening element. By insertion of the insulation member into a casing opening, the sealing surface against the casing can be enlarged and also fastening made easy such as by a sleeve nut, hollow screw, or circlip with eyes.

The insulation member, clamped together, is held in the casing by the fastening element. In this way, sealing can be enhanced by the pressure applied to the elastic insulation member.

According to a further embodiment of the invention, the insulation member is provided with a formed element for sealing against the casing. The formed element can be realized as, for example, one or several circumferential protrusions that correspond to the shape, or contour, respectively, of the casing opening, against which the insulation member is to seal. The protrusions from the elastic material of the insulation member function as the seal being designed, for example, in form of a flat gasket or a bulb seal. Just as advantageously, the insulation member is established having a conical shape.

A preferred design of the shape of the insulation member is a circumferential protrusion having the outer contour of an O-ring that is established over a 180° range. Preferably, in this case, the casing opening is provided with an adequately corresponding groove that accepts the O-ring protrusion of the insulation member so that the sealing function is fulfilled.

According to another embodiment of the invention, the insulation member covers the conductor pin within the casing. This ensures good insulation also against the medium contained in the casing—a refrigerant in case of HVAC compressors. At the same time, the conductor pin is protected from corrosion.

In an advantageous embodiment, the insulation member encloses the connection point of conductor pin and connection cable. In this way the connection, which is preferably established as solder or clipped connection, is protected from corrosion. The connection cable with insulator and conductor pin as a unit is produceable at low cost and easy to install.

In another embodiment, several connection pins are integrated into an insulation member. Accordingly, only one feed-through is required to electrically connect the compressor through the casing and assembly time is reduced.

In a preferred embodiment, the insulation member is made of eEPDM (epoxidized ethylene propylene diene monomer rubber), HNBR (hydrated acrylonitrile butadiene rubber), or silicone rubber.

These materials are permanently elastic and electrically insulating and temperature-resistant and cost-effective as well.

One advantage of the present invention is an elastic design of an electrical feed-through combined with a structurally simple and stable, cost-effective design.

Due to the elastic design of the feed-through based on the elastic insulation member, vibrations are damped and, additionally, tolerances in the mounting or connecting position are easier to maintain, or adjust, respectively. Therefore, position errors of the feeding and leading off contact members can be compensated.

The integration of the sealing member into the insulation member results in a reduced number of components, hence, in savings in component costs and savings as a result of reduced assembly effort due to the reduced number of components.

Further, the feed-through according to the invention can clearly be produced at lower cost due to simplified technology.

Another advantage of the material combination according to the invention is that materials of higher electric conductivity can be used for the pins, also known as connection pins, because the restriction of equal coefficients of thermal expansion of the pin and the glass or ceramic insulation member no longer exists. Therefore, aluminum or brass can be used as pin material, which possibly results in economic or ecologic advantages.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
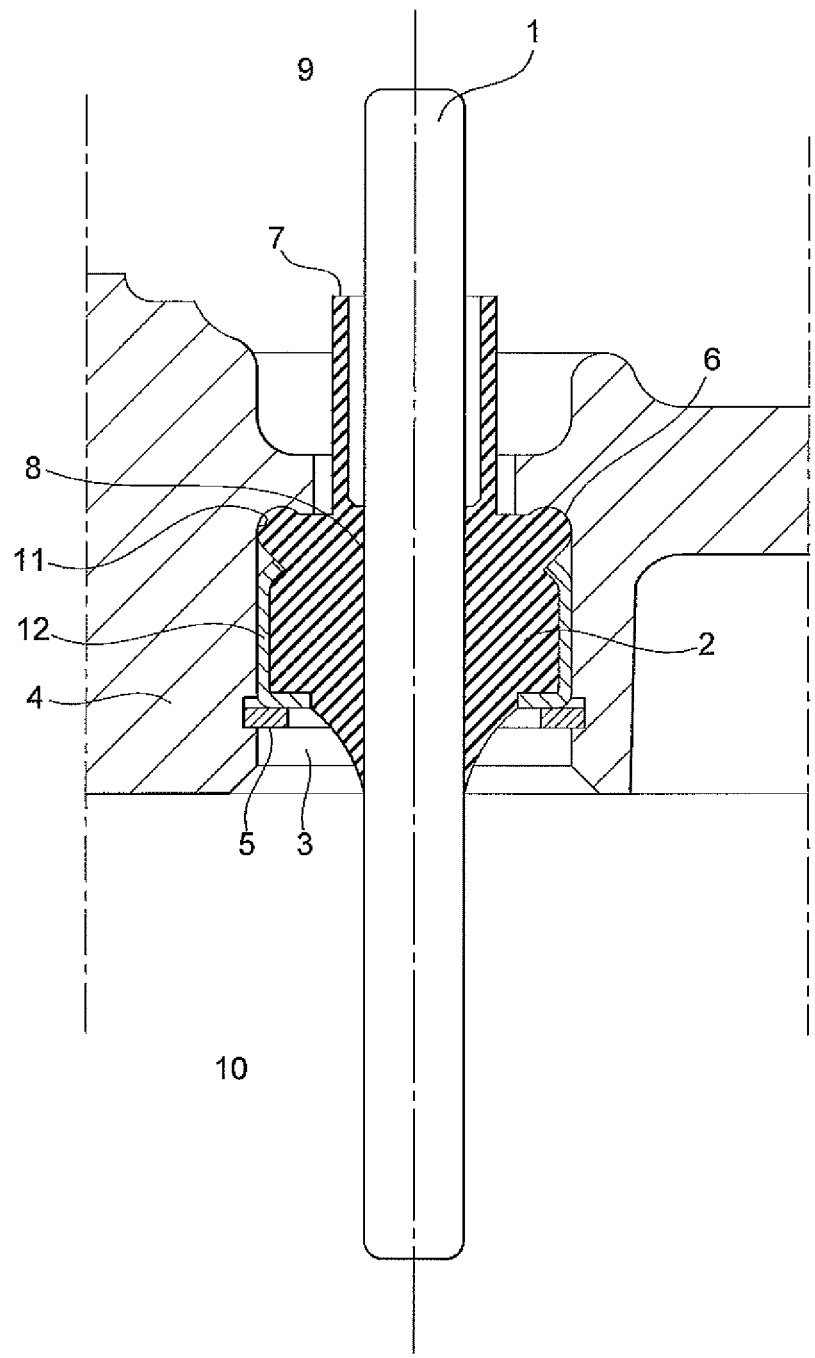
FIG. 1 is a cross-sectional front elevational view of a conductor feed-through according to an embodiment of the present invention.

In the following, an embodiment of the pressure-tight, insulating conductor feed-through will be described in greater detail:

FIG. 1 shows the conductor feed-through for a hermetic compressor passing through a casing 4 of the hermetic compressor.

In the casing 4, there is an opening 3 through which the electric connection pin 1 for the electrically driven HVAC compressor (not shown) is passed with an insulation member 2.

The connection pin 1 is connected by a chemical-physical connection of the materials along a connection region 8 to the insulation member 2. In certain embodiments, the connection is made by vulcanizing the elastic material of the insulation member 2 onto the connection pin 1 so that the connection pin 1 and the insulation member 2 together form a structural unit. Accordingly, the connection between the insulation member 2 and the connection pin 1 is pressure-tight. The insulation member 2 not only serves for electrically insulating, but also for sealing an interior 9 of the casing 4 against an outer region 10. The elastic insulation member 2 compensates for mechanical loads and thermal expansions.

As elastic rubber material for the insulation member 2, advantageously eEPDM (epoxidized ethylene propylene diene monomer rubber), HNBR (hydrated acrylonitrile butadiene rubber) or other vulcanisable material systems are used. Similarly, the material connection to material systems based on silicone is advantageously realizable, if a material connection similar to vulcanizing can be obtained.

The insulation member 2 is provided with a circumferential protrusion 6 in form of an O-ring. In this way, an O-ring is integrated into the insulation member 2.

The opening 3 of the casing 4 is provided with a groove 11 corresponding to the O-ring shape, into which the O-ring protrusion 6 is pressed, thereby sealing against the casing 4.

In certain embodiments, the insulation member 2 is pressed on by means of a fastening member/element 5 (e.g. circlip with eyes). Also a sleeve 12 is arranged between the fastening member/element 5 and the insulation member 2. Alternatively, a hollow screw or a sleeve nut (not shown) can be used. Accordingly, internal or external threads can be provided at the casing 4.

Additionally, the connection pin 1 in the casing interior 9 is provided with a hose-shaped extension/coating 7 disposed on/integrated with the insulation member 2, the hose-shaped extension 7 serving to enhance insulation against the mediums in the interior 9 of the casing 4 and protect the connection pin 1 from, for example, corrosion.

The casing feed-through can be realized in such a way that several conductor pins—insulated against each other, of course—are arranged in an insulation member 2 connected to it.

In the same way, casing feed-throughs for gas- or liquid-carrying conductors can be realized as described above. The term casing, in this connection, is meant to include all types of walls such as of tubes or containers.

The stable sleeve 12 serves to apply the counterpressure distributed over a larger area for clamping the insulation member 2 and the connection pin 1 in the opening 3 of the casing 4, thus counteracting wear of the insulation member 2. According to its function, the sleeve 12 is established to be made of a stable material, such as metal. The sleeve 12 may be formed such that it is positively connected to the insulation member 2. In order to absorb the axial clamping forces from the fastening member 5 designed as a circlip with eyes, the metal sleeve 12 is established radially angled so that the fastening member 5 does not contact the elastic material of the insulation member 2 and the loads for axially clamping the feed-through in the opening 3 are distributed over a larger area.

Figure 2:
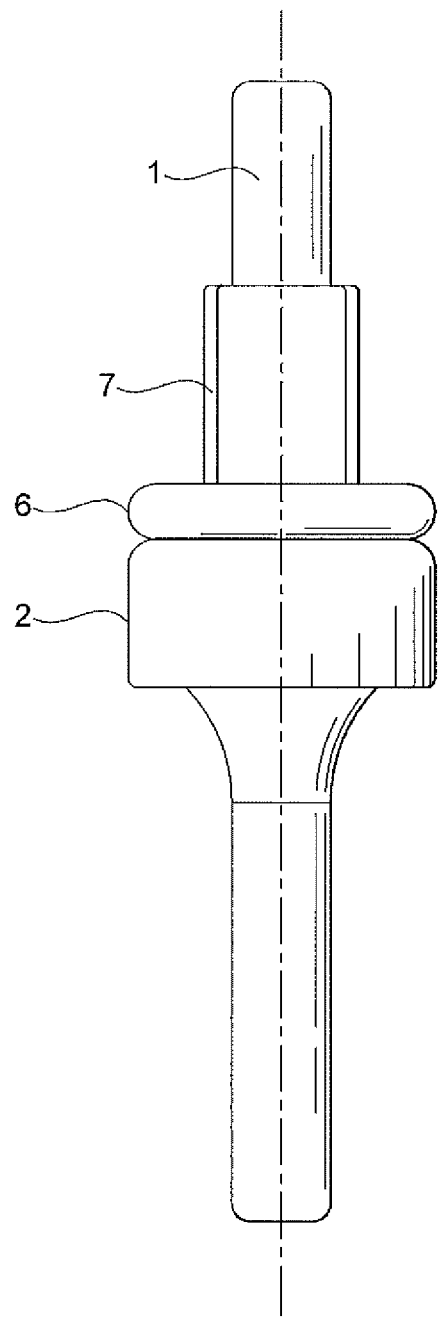
FIG. 2 is a front elevational view of a connection pin of the conductor feed through of FIG. 1.

In FIG. 2, the connection pin 1 with the insulation member 2 is shown. Both the connection pin 1 and the insulation member 2 together establish the electrical feed-through that corresponds in shape and is fixable in the casing 4 of a hermetic compressor. The combination of an electrically conductive connection pin 1 with an electrically non-conductive insulation member 2 enables the function of the electrical feed-through. In addition, the material connection of connection pin 1 and insulation member 2 via vulcanizing the insulation member 2 onto the connection pin 1 creates a material-effected tight connection between both components. Sealing of the feed-through against the casing 4 is caused through the O-ring shaped protrusion 6 formed to the insulation member 2. Accordingly, no additional O-ring has to be provided as a separate part of the feed-through, because functional integration is achieved due to establishing the sealing member against the casing, the O-ring, and the elastic, hence compensating for tolerances, electrical insulation member 2 as one component. The hose-shaped extension 7 reduces the total insulation resistance of the feed-through. As the insulation member 2 is made of eEPDM or HNBR, the feed-through can be used at temperatures up to 150° C., which partially can occur as final compression temperatures or afterheat temperatures. Further, it should be noted that the rubber-metal members according to the invention are cheaper compared with glass-ceramic sealed feed-throughs.

An advantageous effect of the elasticity of the insulation member 2 is that vibrations of the casing 4 against the connection pin 1 are damped so that contact problems at the electrical connections are reduced.

Further application examples of feed-throughs according to the invention are found, for example, in vacuum technology. Generally, feed-throughs according to the invention are advantageously used wherever electrical feed-throughs have to be used in applications with different pressure levels or separated substances.

From the foregoing description, one ordinarily skilled in the art can easily ascertain the essential characteristics of this invention and, without departing from the spirit and scope thereof, make various changes and modifications to the invention to adapt it to various usages and conditions.

NOMENCLATURE

1—conductor pin, connection pin, pin
2—insulation member
3—opening, casing opening
4—casing
5—fastening element, circlip with eyes
6—circumferential protrusion, O-ring protrusion
7—coating, hose-shaped extension
8—connection region
9—casing interior
10—external region, environment
11—groove
12—sleeve

What is claimed is:

1. An electrical feed-through comprising:
an electrically conductive connection pin; and
an elastic insulation member coupled to the connection pin, wherein the coupled connection pin and insulation member are arranged in an opening of a casing of a compressor and pressure-tightly clamped in the opening by a fastening element; wherein the insulation member includes a protrusion circumferentially formed around at least a portion of the insulation member, the protrusion received in a groove formed in the casing of the compressor.

2. The electrical feed-through according to claim 1, wherein the insulation member is coupled to the connection pin by vulcanizing the insulation member.

3. The electrical feed-through according to claim 1, further comprising a sleeve disposed adjacent the insulation member for axially supporting the insulation member.

4. The electrical feed-through according to claim 1, wherein the insulation member includes a hose-shaped extension disposed around a portion of the connection pin.

5. The electrical feed-through according to claim 1, wherein a portion of the connection pin is disposed within an interior of the casing and wherein a hose-shaped extension of the insulation member is disposed around at least a part of the portion of the connection pin disposed within the interior of the casing.

6. The electrical feed-through according to claim 1, wherein the insulation member is formed from epoxidized ethylene propylene diene monomer rubber (eEPDM).

7. The electrical feed-through according to claim 1, wherein the insulation member is formed from hydrated acrylonitrile butadiene rubber (HNBR).

8. The electrical feed-through according to claim 1, wherein the insulation member is formed from silicone rubber.

9. The electrical feed-through according to claim 1, wherein the fastening element is a circlip.

10. An electrical feed-through comprising:
a plurality of electrically conductive connection pins; and
an elastic insulation member coupled to at least a portion of each of the connection pins by vulcanizing the insulation member, wherein the coupled connection pin and insulation member are arranged in an opening of a casing and pressure-tightly clamped in the opening by a fastening element; wherein the insulation member includes a protrusion circumferentially formed around at least a portion of the insulation member, the protrusion received in a groove formed in the casing.

11. The electrical feed-through according to claim 10, further comprising a sleeve disposed adjacent the insulation member for axially supporting the insulation member.

12. The electrical feed-through according to claim 10, wherein a portion of at least one of the connection pins is disposed within an interior of the casing and wherein a hose-shaped extension of the insulation member is disposed around at least a part of the portion of the at least one of the connection pins disposed within the interior of the casing.

13. An electrical feed-through comprising:
an electrically conductive connection pin; and
an elastic insulation member coupled to the connection pin, wherein the coupled connection pin and insulation member are arranged in an opening of a casing and pressure-tightly clamped in the opening by a fastening element, the elastic insulation member including a hose-shaped extension extending axially from the insulation member with respect to the connection pin and a protrusion circumferentially formed around at least a portion of the insulation member.

14. The electrical feed-through according to claim 13, wherein the casing of the compressor includes a groove for receiving the protrusion formed on the insulation member.

15. The electrical feed-through according to claim 13, further comprising a sleeve disposed adjacent the insulation member for axially supporting the insulation member.

16. The electrical feed-through according to claim 13, wherein a portion of the connection pin is disposed within an interior of the casing and wherein a hose-shaped extension of the insulation member is disposed around at least a part of the portion of the connection pin disposed within the interior of the casing.

17. An electrical feed-through comprising:
an electrically conductive connection pin;
an elastic insulation member coupled to the connection pin, wherein the coupled connection pin and insulation member are arranged in an opening of a casing of a compressor and pressure-tightly clamped in the opening by a fastening element; and
a sleeve disposed adjacent the insulation member for axially supporting the insulation member.

18. An electrical feed-through comprising:
an electrically conductive connection pin; and
an elastic insulation member coupled to the connection pin, wherein the coupled connection pin and insulation member are arranged in an opening of a casing of a compressor and pressure-tightly clamped in the opening by a fastening element, wherein the insulation member includes a hose-shaped extension disposed around a portion of the connection pin.

* * * * *